(12) United States Patent
Gatlin et al.

(10) Patent No.: US 7,392,847 B2
(45) Date of Patent: Jul. 1, 2008

(54) AGGREGATING REAGENTS, MODIFIED PARTICULATE METAL-OXIDES, AND METHODS FOR MAKING AND USING SAME

(75) Inventors: Larry W. Gatlin, San Antonio, TX (US); Frank Zamora, San Antonio, TX (US); Jim Venditto, Richmond, TX (US); Sarkis Kakadjian Ranka, San Antonio, TX (US)

(73) Assignee: Clearwater International, LLC, Houston, TX (US)

( * ) Notice: Subject to any disclaimer, the term of this patent is extended or adjusted under 35 U.S.C. 154(b) by 0 days.

(21) Appl. No.: 11/298,547

(22) Filed: Dec. 9, 2005

(65) Prior Publication Data

US 2007/0131425 A1 Jun. 14, 2007

(51) Int. Cl.
*E21B 43/26* (2006.01)
(52) U.S. Cl. .................................. 166/308.1; 166/280.1
(58) Field of Classification Search ........................ None
See application file for complete search history.

(56) References Cited

U.S. PATENT DOCUMENTS

| 5,775,425 A | 7/1998 | Weaver et al. ............... 166/276 |
|---|---|---|
| 5,787,986 A | 8/1998 | Weaver et al. ............. 166/280.2 |
| 5,833,000 A | 11/1998 | Weaver et al. ............... 166/276 |
| 5,853,048 A | 12/1998 | Weaver et al. ............... 166/279 |
| 5,871,049 A | 2/1999 | Weaver et al. ............... 166/276 |
| 6,047,772 A | 4/2000 | Weaver et al. ............... 166/276 |
| 6,311,773 B1 * | 11/2001 | Todd et al. ............... 166/280.2 |
| 6,668,926 B2 * | 12/2003 | Nguyen et al. ............. 166/281 |
| 6,725,931 B2 | 4/2004 | Nguyen et al. ........... 166/280.2 |
| 6,832,650 B2 | 12/2004 | Nguyen et al. ............. 166/279 |
| 2002/0165308 A1 | 11/2002 | Kinniard et al. ............. 524/492 |
| 2003/0220204 A1 | 11/2003 | Baran et al. ................. 507/200 |
| 2005/0092489 A1 | 5/2005 | Welton ..................... 166/280.2 |
| 2006/0260813 A1 * | 11/2006 | Welton et al. ............ 166/280.2 |

* cited by examiner

*Primary Examiner*—Zakiya W. Bates
*Assistant Examiner*—Angela M DiTrani
(74) *Attorney, Agent, or Firm*—Robert W. Strozier

(57) ABSTRACT

A method for treating solid materials is disclosed, where the treating compositions coats surfaces or portions of surfaces of the solid materials changing an aggregation or agglomeration propensity of the materials. Treated solid materials are also disclosed. The methods and treated materials are ideally suited for oil field applications.

28 Claims, 2 Drawing Sheets

AGGREGATING REAGENTS, MODIFIED PARTICULATE METAL-OXIDES, AND METHODS FOR MAKING AND USING SAME

BACKGROUND OF THE INVENTION

1. Field of the Invention

The present invention relates to aggregating agents for solid materials or substrates including metal oxide or ceramic solid materials or substrates (natural or synthetic), metallic solid materials or substrates, polymeric or plastic solid materials or substrates (natural or synthetic), solid plant materials or substrates (natural or treated), or other types of solid materials or substrates and methods for making and using same.

More particularly, the present invention relates to aggregating agents for particulate solid materials or substrates, where the aggregating agents modify surface properties of the particulate solid materials increasing their aggregating propensity or properties. The present invention also relates to coated or modified particulate solid materials capable of self-aggregation. The present invention also relates to methods for aggregating particulate solid materials, especially in downhole applications and in any other application where particulate metal oxide-containing solids aggregation is desirable.

2. Description of the Related Art

In many situations, sand, particulate metal oxide-containing solids or other particulate materials or solid materials are difficult to consolidate in underground formations once placed due to their inability to aggregate or to cling to each other or to form aggregated masses that allow formation fluid flow back through the placed or pumped-in fluids without flowing solids back to the surface. In addition, other situations occur where formation sand flows due to formation unconsolidated characteristics, and the flowing sand is transported to the surface during well production.

Although several technologies now exist for tackifying such particulate solid with a tackifying agent, there is a need in the art of a different treating composition to cause such particulate solids to self-aggregate and to methods for making self-aggregating particulate solids.

SUMMARY OF THE INVENTION

Compositions

The present invention provides a particulate solid material such as a metal oxide-containing solid having improved self-aggregating properties. The improved self-aggregating or aggregation propensity of the particles derives from the surfaces of the particulate solids having a coating including a reaction product of a phosphate ester and an amine.

The present invention provides particulate solid material such as a metal oxide-containing solids having a coating including a reaction product of an amine and a phosphate ester, where the coating deforms under pressure and imparts an enhanced aggregating propensity to the solid particles.

The present invention provides an aggregated particulate solid material such as metal oxide-containing solid composition including a particulate metal oxide-containing solid coated with a reaction product of an amine and a phosphate ester, where the coating is deformable.

The present invention provides a substrate having surfaces partially or completely coated with a composition of this invention comprising a reaction product of an amine and a phosphate ester, where the coating is deformable and where the substrate is ideally suited for filtering fines and/or other particulate materials form from a fluid, especialiy fluids used in oil/gas well drilling, completion, production, fracturing, propping, other production enhancing processes or other related applications. The structures can be ceramic or ceramic fibers or wools coated partially or completely with the compositions of this invention. Such structures are well suited for filter media to be used with or without screens.

Method for Treating

The present invention provides a method for changing an aggregation potential or propensity of a particulate solid material such as a metal oxide-containing solid, where the method includes the step of contacting the particulate solid material with a composition including an amine and a phosphate ester under conditions sufficient for the amine and phosphate ester to react forming a partial or complete coatings on surfaces of particulate solid material.

Methods for Using the Treating Methods

Fracturing

The present invention provides a method for fracturing a formation including the step of pumping a fracturing fluid including a proppant into a producing formation at a pressure sufficient to fracture the formation and to enhance productivity, where the proppant props open the formation after fracturing and where the proppant comprises a particulate solid treated with a treating composition comprising an amine and a phosphate ester under conditions sufficient for the amine and phosphate ester to react forming a partial or complete coating on surfaces of particulate solid material.

The present invention provides a method for fracturing a formation including the step of pumping a fracturing fluid including a proppant and an aggregating composition of this invention into a producing formation at a pressure sufficient to fracture the formation and to enhance productivity. The composition results in a modification of an aggregation propensity, and/or zeta-potential of the proppant, formation particles and formation surfaces so that the formation particles and/or proppant aggregate and/or cling to the formation surfaces.

The present invention provides a method for fracturing a formation including the step of pumping a fracturing fluid including an aggregating composition of this invention into a producing formation at a pressure sufficient to fracture the formation and to enhance productivity. The composition results in a modification of an aggregation propensity, potential and/or zeta-potential of the formation particles and formation surfaces so that the formation particles aggregate and/or cling to the formation surfaces. The method can also include the step of pumping a proppant comprising a coated particulate solid composition of this invention after fracturing so that the coated particles prop open the fracture formation and tend to aggregate to the formation surfaces and/or formation particles formed during fracturing.

Drilling

The present invention provides a method for drilling including the step of while drilling, circulating a drilling fluid, to provide bit lubrication, heat removal and cutting removal, where the drilling fluid includes an aggregating composition of this invention. The composition increases an aggregation potential or propensity and/or alters a zeta potential of any particulate metal oxide-containing solid in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease the absolute value of the zeta potential of any particulate solids in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cuffing removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease in the absolute value of the zeta potential of any particulate solids in the drilling fluid or that becomes entrained in the drilling fluid to increase solids removal. After passing through the structure that produces an undesired quantities of particulate solids, change the second drilling fluid to the first drilling fluid or a third drilling fluid. The method can be operated in over-pressure conditions or under-balanced conditions or under managed pressure conditions. The method is especially well tailored to under-balanced or managed pressure conditions.

Producing

The present invention provides a method for producing including the step of circulating and/or pumping a fluid into a well on production, where the fluid includes a composition of this invention, which increases an aggregation potential or decreases the absolute value of the zeta potential of any particulate solid in the fluid or that becomes entrained in the fluid to increase solid particle removal and to decrease the potential of the particles to plug the formation and/or the production tubing.

The present invention also provides a method for controlling sand or fines migration including the step of pumping a fluid including a composition of this invention through a matrix at a rate and pressure into a formation to control sand and fine production or migration into the production fluids.

The present invention also provide another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
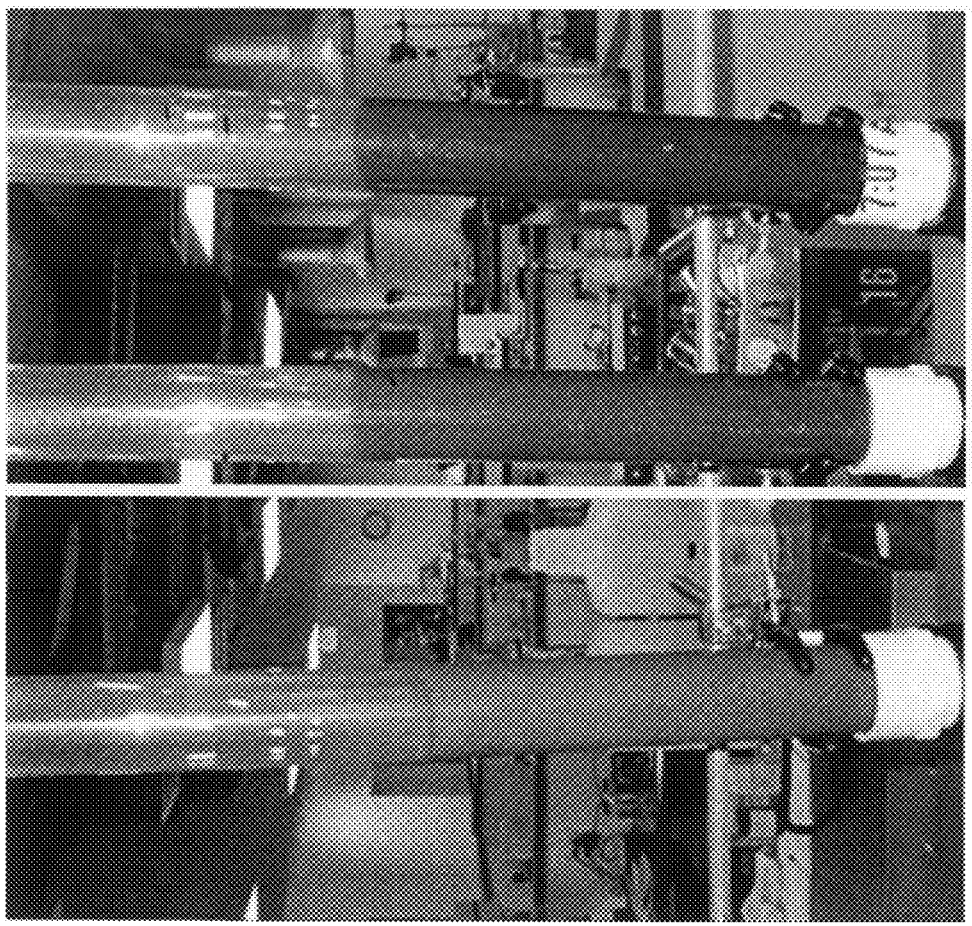
FIG. 1 is a photograph depicting a untreated sand pack and sand packs treated with 5% v/w of aggregating compositions designated SG-4 and SG-1, respectively.

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used any other application where increased particle aggregation potentials are desirable or where decreased absolute values of the zeta potential of the particles, which is a measure of aggregation propensity, is desired. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating, That is to say, that the coated particles tend to prefer like compositions, which increase their self aggregation propensity and increase their ability to adhere to surface that have similar chemical and/or physical properties. The inventors have found that the coating compositions of this invention are distinct From known compositions for modifying particles aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

In the case of drilling, the compositions of this invention can be used to coat the formation surfaces and formation cuttings during drilling, because the particle tend to self aggregate and/or cling to similarly modified formation surfaces. Again, an advantage of the self-aggregation is a reduced tendency of the cuttings to foul or plug screens. Additional advantages are to coat the formation walls with a composition of this invention during drilling to consolidate the formation and to consolidate or aggregate fines or particles in the drilling fluid to keep the rheological properties of the drilling fluid from changing and increasing equivalent circulating density (ECD).

Compositions

The invention broadly relates to a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to a method for treating metal oxide-containing surfaces including the step of contacting the metal oxide-containing surface with a composition of this invention. The composition forms a coating on the surface altering the properties of the surface so that the surface is now capable to interacting with similarly treated surfaces to form agglomerated and/or aggregated structures. The treating can be designed to coat continuous metal oxide containing surfaces and/or the surfaces of metal oxide containing particles. If both are treated, then the particles cannot only self-aggregate, but the particles can also aggregate, agglomerate and/or cling to the coated continuous surfaces. The compositions can be used in fracturing fluids, in drilling fluids, in completion fluids, in sand control applications or any other downhole application. Additionally, the coated particles can be used in fracturing fluids. Moreover, structures, screens or filters coated with the compositions of this invention can be used to attract and remove fines that have been modified with the compositions of this invention.

Method for Fracturing and/or Propping

The present invention broadly relates to methods for fracturing a formation including the step of pumping a fracturing fluid including a composition of this invention into a producing formation at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepad step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance enhanced degree of formation propping.

Method for Drilling

The present invention also broadly relates to a method for drilling including the step of, while drilling, circulating a drilling fluid to provide bit lubrication, heat removal and cutting removal, where the drill fluid includes a composition of this invention, which increases an aggregation potential or decrease an absolute value of the zeta potential of any particulate solids in the drilling fluid or that becomes entrained in the drilling fluid to increase solids removal.

The present invention also broadly relates to a method for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or decrease an absolute value of the zeta potential of any solid including particulate metal oxide-containing solids in the drilling fluid or that becomes entrained in the drilling fluid to increase solids removal.

The present invention also broadly relates to a method for drilling including the step of, while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or zeta potential of any particulate solid including metal oxide-containing solid in the drilling fluid or that becomes entrained in the drilling fluid to increase solids removal. After passing through the structure that produces an undesired quantities of particulate metal oxide-containing solids, change the second drilling fluid for the first drilling fluid or a third drilling fluid.

Method for Producing

The present invention also broadly relates to a method for producing including the step of circulating and/or pumping a fluid into, where the fluid includes a composition of this invention, which increases an aggregation potential or decreases an absolute value of the zeta potential of any particulate solid including a metal oxide-containing solid in the fluid or that becomes entrained in the fluid to increase solids removal and to decrease the potential of the particles plugging the formation and/or production tubing.

Suitable Agents

Suitable amines include, without limitation, any amine that is capable of reacting with a suitable phosphate ester to form a composition that forms a deformable coating on a metal-oxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$ where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

EXPERIMENTS OF THE INVENTION

Example 1

This example illustrates general procedures used in the preparation and testing of sand treated with an aggregating composition of this invention.

700 grams of 20/40 sand were pallet mixed at 1000 rpm in distilled water including 2 wt. % KCl at a sand to solution concentration of 1 lb/gal for 15 minutes. An aggregating composition of this invention was then added to the sand slurry in a concentration ranging from 0 to 8 gptg. The resulting slurry was mixed for 15 minutes at 1000 rpm. The treated sand slurry was then poured into a PVC flow rate cylinder and flushed with at least 5 volumes of fresh 2 wt. KCl. The flow rate of the 2 wt. % KCl solution was then measured through the resulting treated sand pack.

Example 2

This example illustrates the other set of general procedures used in the preparation and testing of sand treated with an aggregating compositions of this invention.

700 grams of 20/40 sand was pre-treated with an aggregating composition of this invention at concentration of 1.5, 3.0 and 5.0% v/w. The composition was stirred into the dry sand using a spatula for 5 minutes. After dry mixing, a 2.0 wt. % KCl solution was added with stirring. The resulting slurry of treated sand was poured into a PVC flow rate cylinder and washed with at least 5 volumes of 2.0 wt. % KCl. The flow rate of the 2 wt. % KCl solution was then measured through the sand pack.

The following aggregating compositions were prepared and test according to the procedures described in Examples 1 and 2.

| SG-1 | |
|---|---|
| Components | wt. % |
| Akolidine 11 (mixture of alkyl pyridines from Lonza, Inc. of NJ) | 42.46 |
| Phosphate Ester formed from 54 wt. % polyphosphoric acid, 32 wt. % triethanolamine and 14.18 wt. % water | 13.31 |
| Methanol | 44.23 |

| SG-2 | |
|---|---|
| Components | wt. % |
| Benzyl Quaternary of Coconut Amide | 13.83 |
| Genamin T150 (Ethoxylated Amine) | 10.35 |
| Nonylphenyl Phosphate Ester | 5.22 |
| Crude Tall Oil | 3.15 |
| Quaternary Ammonium Chloride | 57.45 |
| Demulsifier (CIM 940) | 9 |
| Alkyl Phenol Resin Oxyalkaline (DRC 168) | 1 |

| SG-3 | |
|---|---|
| Components | wt. % |
| Benzyl Quaternary of Coconut Amide | 15.37 |
| Genamin T150 (Ethoxylated Amine) | 11.5 |
| Nonylphenyl Phosphate Ester | 5.8 |
| Crude Tall Oil | 3.5 |
| Quaternary Ammonium Chloride formed from 49 wt. % Akolidine 11 (mixture of alkyl pyridines from Lonza, Inc.), 25 wt. % Benzyl chloride and 26.08 wt. % methanol | 63.83 |

| SG-4 | |
|---|---|
| Components | wt. % |
| Quaternary Ammonium Chloride formed from 49 wt. % Akolidine 11 (mixture of alkyl pyridines from Lonza, Inc.), 25 wt. % Benzyl chloride and 26.08 wt. % methanol | 42.26 |
| Phosphate Ester formed from 54 wt. % polyphosphoric acid, 32 wt. % triethanolamine and 14.18 wt. % water | 13.31 |
| Methanol | 44.23 |

| SG-5 | |
|---|---|
| Components | wt. % |
| SG-2 | 42.46 |
| Methanol | 44.23 |
| Phosphate Ester formed from 54 wt. % polyphosphoric acid, 32 wt. % triethanolamine and 14.18 wt. % water | 13.31 |

Zeta Potential Measurements

The Zeta potential is defined by the charge that develops at the interface between solid surfaces. Zeta potential is therefore a function of the surface charge of the particle, any adsorbed layer at the interface, and the nature and composition of the surrounding suspension medium. In other words Zeta potential can be affected by (1) changes in pH, (2) conductivity of the medium (Salinity and kind of salt), and (3) concentration of particular additives (polymer, non-ionic surfactants etc.).

In order to get the Zeta Potential using the Zetasizer (Nano) Z of Malvern by microelectrophoresis the system needs to have solids or colloids in the range between 3 nm and 20 μm. To characterize the influence of different additives in the system, Silica Flour was used instead of sand 20/40.

The amount of silica powder was set at 0.25 ppg in order to decrease the settling effects during the tests measurements.

On the other hand, the only way to get well defined peaks (as narrow as possible) was to add KCl in concentrations of 0.5% or less.

Table 1 show the results of the influence of the additive SG-1 on the measured Zeta Potential values when the additive was added to a Silica Flour slurry with mixed. It was found that Zeta Potential values varied with time indicating that increased exposure time allows the additive to absorbs on the particle. Although the measured Zeta Potential values were well in the range between −30 and 30 mV the measures were not considered reliable when the standard deviation were higher than 250 mV.

TABLE 1

Zeta Potentials of SG-1 Treated Sand

| SG-1 Concentration (pptg) | Mean Zeta Potential (mV) | Zeta Potential deviation (mV) |
|---|---|---|
| 0 | −47.8 | 38.1 |
| 2 | 4.13 | 377.6* |
| 4 | −0.6 | 276.9* |
| 6 | 2.52 | 419.4* |

*The phase behavior of Zeta-Potential measurements were not good enough giving high Zeta potential deviation.
Final pH 6.16-6.22

Flow Tests Through Sand Pack

It was determined the influence of the sand grip additives in the flow of 2% KCl solution through a 20/40 pretreated sand.

Table 2 shows no effect pre-treating the sand with SG-1 in the in flowing of 2% KCl brine.

TABLE 2

Sand Flow Rate Measurements Through SG-1 Treated Sand

| SG-1 Concentration (gptg) | Average flow rate (ml/min) | Flow rate ratio (Treat./N-Treat.) |
|---|---|---|
| 0 | 387 | 1.00 |
| 2 | 461 | 1.03 |
| 4 | 419 | 1.08 |
| 8 | 408 | 1.05 |

Effects of Pre-Treating the Sand in Dry Conditions

It was determined the influence of the aggregating additives in the flow of 2% KCl solution through a 20/40 pre-treated sand. In this case the sand was pre-treated in dry before being mixed with the 2.0% KCl Solution. The sand slurry was then poured into a plastic cylinder and after being washed with 5 volumes of 2% KCl solution. The flow rate through the sand pack was then determined using the brine solution.

Table 3 shows the effect of additives SG1 to SG5 in the brine flow when added to dry sand at concentration of 5% v/w. In this case it was observed that only the sand pretreated with SG1 and SG-4 showed a clear immediate increase in the flow rate through the sand system. When treated the sand in dry with 5% v/w of SG-1 and SG-4 it was also observed a clear increase in the sand pack height as shown in FIG. 1.

Figure 2:
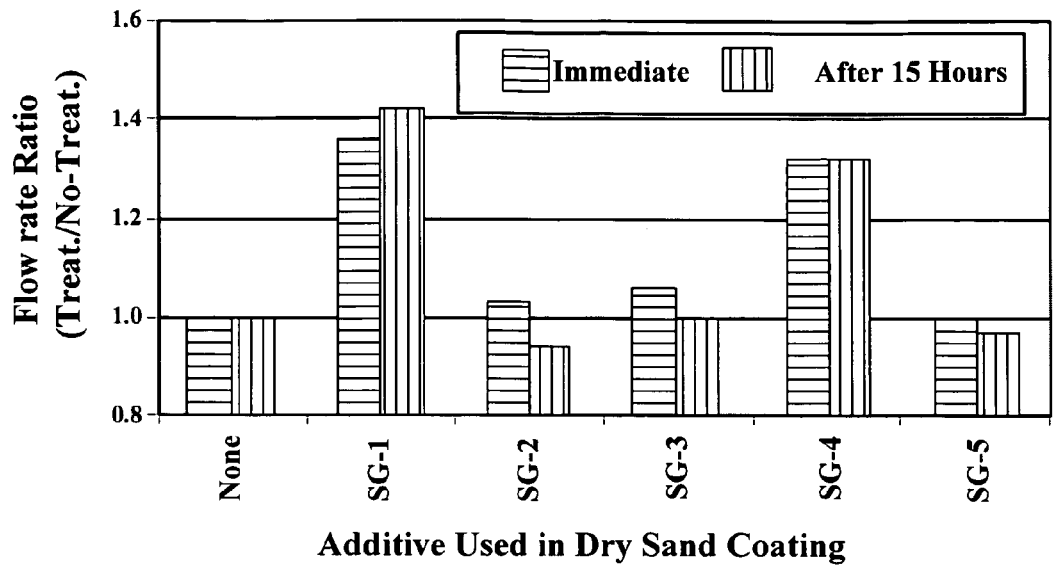
FIG. 2 depicts a chart of flow rate ratio of 2 wt. % KCl brine through an untreated sand pack and sand packs treated with 5% v/w often aggregating compositions of this invention designated SG-1 through SG-5.

Referring now to FIG. 2, treating the sand with 5% v/w of SG-1 and SG-4 showed an appreciable increase in the flow rate of 2% KCl solution after initially and after 15 hours of treatment compared to the untreated sand. Treatment with SG-2, SG-3 and SG-5 show little difference in the flow rate ratio compared to the untreated sand.

Figure 3:
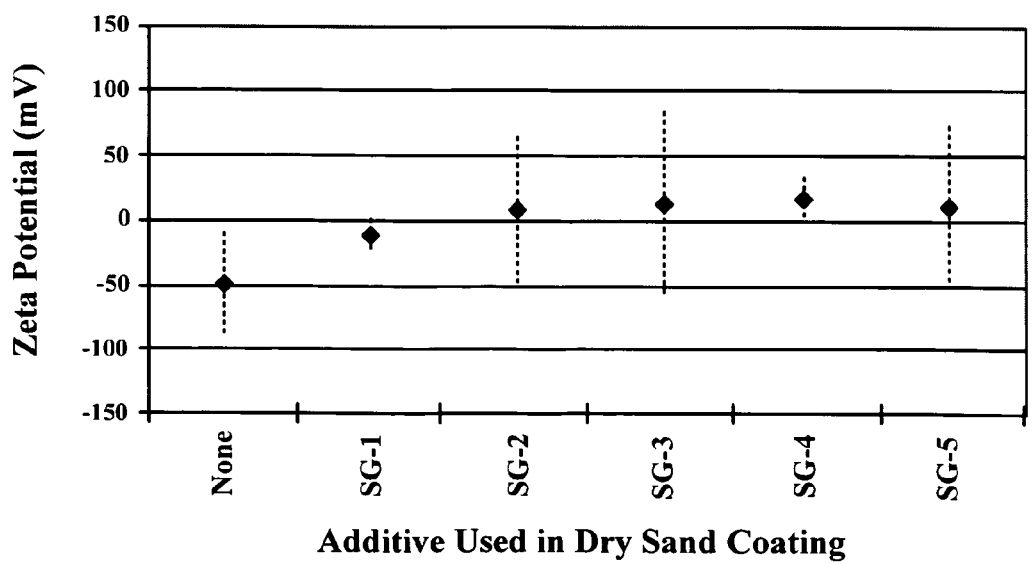
FIG. 3 depicts a graph of Zeta potential mean and deviation values of untreated silica flour and silica flour treated with 5% v/w often aggregating compositions of this invention designated SG-1 through SG-1, where the initial Silica flour concentration was 0.25 ppg in 0.5 wt. % KCl brine.

Referring now to FIG. 3, the changes in the Zeta Potential with the addition of SG-1 to SG-5 are shown when added to dry silica flour and later measured in a 0.25 ppg of silica flour in 0.5% KCl solution. In this case as it was expected SG-1 and SG-4 not only show Zeta Potential values between 20 and −20 mV, but also the lowest standard deviation in the measurement.

TABLE 3

Flow Rate Measurements Through Pre-treated Sand

| Treating Agent | Average Flow Rate immediate (after 15 h) (mL/min) | Flow Rate Ratio treated/untreated immediate (after 15 h) | Zeta Potential‡ (mV) | Observation |
|---|---|---|---|---|
| Control | 352 (352) | 1.00 (1.00) | −47.85 ± 38.19 | |
| SG-1 | 480 (500) | 1.36 (1.42) | −11.72 ± 13.81 | increase in pack height |
| SG-2 | 367 (333) | 1.03 (0.94) | 9.9 ± 55.5 | |
| SG-3 | 375 (353) | 1.06 (1.00) | 13.28 ± 71.83 | |
| SG-4 | 467 (467) | 1.32 (1.32) | 17.72 ± 15.99 | increase in pack height |
| SG-5 | 352 (342) | 1.00 (0.97) | 11.28 ± 61.75 | |

‡In 0.25 ppg of Silica Flour and 0.5% KCl solution

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising the step of:
pumping a fracturing fluid including a proppant into a producing formation at a pressure sufficient to fracture the formation and to enhance productivity, where the proppant props open the formation after fracturing and where the proppant comprises a particulate solid material treated with a treating composition comprising a reaction product of an amine and a phosphate ester, where the compositions forms a partial or complete coating on surfaces of a particulate solid material.

2. The method of claim 1, wherein the amine comprises amines having the general formula $R^1$, $R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

3. The method of claim 1, wherein the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

4. The method of claim 1, wherein the phosphate ester comprises phosphate esters having the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

5. The method of claim 1, wherein the phosphate ester comprise phosphate ester of alkanols having the general formula $P(O)(OH)_x(OR^6)_y$ where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

6. The method of claim 5, wherein the phosphate ester comprise ethoxy phosphate, propoxyl phosphate or higher alkoxy phosphates or mixtures or combinations thereof.

7. The method of claim 1, wherein the phosphate ester comprise phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

8. The method of claim 1, wherein the phosphate ester comprise phosphate esters of hydroxylated aromatics.

9. The method of claim 8, wherein the phosphate esters of hydroxylated aromatics include phosphate esters of alkylated phenols or phenolic phosphate esters.

10. The method of claim 1, wherein the phosphate ester comprise phosphate esters of diols and polyols.

11. The method of claim 10, wherein the phosphate esters of diols and polyols include phosphate esters of ethylene glycol, phosphate esters of propylene glycol, or phosphate esters of higher glycolic structures.

12. The method of claim 1, wherein the particulate solid material is selected from the group consisting of natural or synthetic metal oxides and/or ceramics, metals, plastics and/or other polymeric solids, solid materials derived from plants, and mixtures or combinations thereof.

13. The method of claim 12, wherein the metal oxides is selected from the group consisting of any solid oxide of a metallic element of the periodic table of elements.

14. The method of claim 12, wherein the metal oxides and/or ceramics are selected from the group consisting of actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides.

15. The method of claim 12, wherein the plant materials is selected from the group consisting of shells of seed bearing plants, ground wood or other fibrous cellulosic materials, and mixtures or combinations thereof.

16. The method of claim 15, wherein the shells of seed bearing plants are selected from walnut shells, pecan shells, peanut shells, and shells for other hard shelled seed forming plants.

17. A method for fracturing a formation comprising the step of:
pumping a fracturing fluid into a formation at a pressure sufficient to fractures the formation and to enhance productivity of the formation; and
pumping a proppant into the formation, where the proppant comprises a particulate solid material treated with a treating composition including a reaction product of an amine and a phosphate ester, where the compositions forms a partial or complete coating of the reaction product on surfaces of the particulate solid material,
where the proppant props open the fractured formation and where the proppants tend to aggregate to the formation surfaces and/or formation particles formed during fracturing to enhance formation productivity.

18. The method of claim 17, wherein the fracturing fluid includes an aggregating composition including a reaction product of an amine and a phosphate ester, where the aggregating composition is designed to coat surfaces of the formation and formation particulates generated with the reaction product before, during and after fracturing to change a zeta potential or aggregation potential of the surfaces of the formation or the formation particulates.

19. The method of claim 17, further comprising the step of:
pre-treating the formation with an aggregating composition including a reaction product of an amine and a phosphate ester, where the aggregating composition is designed to coat surfaces of the formation with the reaction product prior to fracturing to change a zeta potential or aggregation potential of the surfaces and formation particulate formed during fracturing.

20. A method for fracturing a formation comprising the step of:
pumping a fracturing fluid including a proppant into a producing formation at a pressure sufficient to fracture the formation and to enhance productivity,
where the proppant props open the formation after fracturing and where the proppant comprises a particulate solid material treated with a treating composition comprising a reaction product of an alkyl pyridine or a mixture of alkyl pyridines and a phosphate ester having the general formula $P(O)(OR^3)(OR^4)(OR^5)$, where $R^3$, $R^4$, and $R^5$ are hydrogen atoms, where the compositions forms a partial or complete coating on surfaces of a particulate solid material.

21. The method of claim 20, wherein the particulate solid material is selected from the group consisting of natural or synthetic metal oxides and/or ceramics, metals, plastics and/or other polymeric solids, solid materials derived from plants, and mixtures or combinations thereof.

22. The method of claim 21, wherein the metal oxide is selected from the group consisting of any solid oxide of a metallic element of the periodic table of elements.

23. The method of claim 21, wherein the metal oxides and/or ceramics are selected from the group consisting of actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides.

24. The method of claim 21, wherein the plant materials is selected from the group consisting of shells of seed bearing plants, ground wood or other fibrous cellulosic materials, and mixtures or combinations thereof.

25. The method of claim 24, wherein the shells of seed bearing plants are selected from walnut shells, pecan shells, peanut shells, and shells for other hard shelled seed forming plants.

26. A method for fracturing a formation comprising the step of:
pumping a fracturing fluid into a formation at a pressure sufficient to fracture the formation and to enhance productivity of the formation; and
pumping a proppant into the formation, where the proppant comprises a particulate solid material treated with a treating composition including a reaction product of an alkyl pyridine or a mixture of alkyl pyridines and a phosphate ester having the general formula $P(O)(OR^3)(OR^4)(OR^5)$, where $R^3$, $R^4$, and $R^5$ are hydrogen atoms, where the compositions forms a partial or complete coating of the reaction product on surfaces of the particulate solid material,
where the proppant props open the fractured formation and where the proppants tend to aggregate to the formation surfaces and!or formation particles formed during fracturing to enhance formation productivity.

27. The method of claim 26, wherein the fracturing fluid includes an aggregating composition including a reaction product of an alkyl pyridine or a mixture of alkyl pyridines and a phosphate ester having the general formula $P(O)(OR^3)(OR^4)(OR^5)$, where $R^3$, $R^4$, and $R^5$ are hydrogen atoms, where the aggregating composition is designed to coat surfaces of the formation and formation particulates generated with the reaction product before, during and after fracturing to change a zeta potential or aggregation potential of the surfaces of the formation or the formation particulates.

28. The method of claim 26, further comprising the step of:
pre-treating the formation with an aggregating composition including a reaction product of an alkyl pyridine or a mixture of alkyl pyridines and a phosphate ester having the general formula $P(O)(OR^3)(OR^4)(OR^5)$, where $R^3$, $R^4$, and $R^5$ are hydrogen atoms, where the aggregating composition is designed to coat surfaces of the formation with the reaction product prior to fracturing to change a zeta potential or aggregation potential of the surfaces and formation particulate formed during fracturing.

* * * * *